(12) United States Patent
Jackson et al.

(10) Patent No.: US 7,775,227 B2
(45) Date of Patent: Aug. 17, 2010

(54) AMBULATORY AID WITH STEP COUNTER

(75) Inventors: David Jackson, Columbia, MD (US);
Robert O'Toole, Baltimore, MD (US);
W. Andrew Eglseder, Ellicott City, MD (US); Mary Zadnik Newell, Reisterstown, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 0 days.

(21) Appl. No.: 11/848,199

(22) Filed: Aug. 30, 2007

(65) Prior Publication Data
US 2008/0072941 A1    Mar. 27, 2008

Related U.S. Application Data

(60) Provisional application No. 60/824,224, filed on Aug. 31, 2006.

(51) Int. Cl.
*A45B 3/00* (2006.01)
(52) U.S. Cl. .......................................... 135/66; 135/65
(58) Field of Classification Search .................. 135/65, 135/66
See application file for complete search history.

(56) References Cited

U.S. PATENT DOCUMENTS 5,373,651 A * 12/1994 Wood .......................... 36/114
6,658,079 B1   12/2003 Macklin et al.
6,745,786 B1 *  6/2004 Davis ........................... 135/65
2006/0142670 A1  6/2006 DiSilvestro et al.

FOREIGN PATENT DOCUMENTS

DE    202007001333 U1 *   8/2007

* cited by examiner

*Primary Examiner*—David Dunn
*Assistant Examiner*—Danielle Jackson
(74) *Attorney, Agent, or Firm*—Kristina Castellano; Castellano PLLC

(57) ABSTRACT

A step-counting ambulatory aid having a ground-contacting surface, which aid comprises a pressure-sensitive switch on the ground-contacting surface and a data recorder located elsewhere on the aid, wherein the pressure-sensitive switch is activated upon contact of the ground-contacting surface of the aid with ground, whereupon the pressure-sensitive switch sends a signal to the data recorder, which records the signal as a step; a method of counting the number of steps taken by a user of an ambulatory aid comprising having the user use an ambulatory aid equipped with a step counter; and a method of establishing a therapeutic regimen for a patient in need of an ambulatory aid comprising determining the number of steps that the patient should take during a set period of time, providing the patient with an ambulatory aid equipped with a step counter, and instructing the patient to take the determined number of steps with the ambulatory aid during the set period of time.

6 Claims, 6 Drawing Sheets

AMBULATORY AID WITH STEP COUNTER

CROSS REFERENCE TO RELATED APPLICATIONS

This patent application claims priority to U.S. provisional patent application No. 60/824,224, filed on Aug. 31, 2006, the content of which is incorporated herein by reference in its entirety.

TECHNICAL FIELD OF THE INVENTION

The present invention relates to an ambulatory aid, a pressure-sensitive switch, a data recorder, and the use of a pressure-sensitive switch and a data recorder in combination with an ambulatory aid to count the number of steps taken by a user of the ambulatory aid.

BACKGROUND OF THE INVENTION

Ambulatory aids come in many forms, such as crutches, canes, and walkers. Each aid is suited for a particular use. Currently, ambulatory aids do not enable physicians, physical therapists, and caregivers to monitor the number of steps taken by a user of the ambulatory aid. The ability to monitor the number of steps taken by a user of an ambulatory aid is desirable, however, inasmuch as it would enable one to monitor overall activity level and recovery progress.

The present invention seeks to overcome such a deficiency in the art. This and other objects and advantages, as well as additional inventive features, will be apparent from the detailed description provided herein.

BRIEF SUMMARY OF THE INVENTION

The present invention provides a step-counting ambulatory aid having a ground-contacting surface. The aid comprises a pressure-sensitive switch on the ground-contacting surface. The aid further comprises a data recorder located elsewhere on the aid. The pressure-sensitive switch is activated upon contact of the ground-contacting surface of the aid with ground. Upon activation of the pressure-sensitive switch, the switch sends a signal to the data recorder. The data recorder records the signal as a step.

The present invention also provides a method of counting the number of steps taken by a user of an ambulatory aid. The method comprises having the user use an ambulatory aid equipped with a step counter.

Also provided by the present invention is a method of establishing a therapeutic regimen for a patient in need of an ambulatory aid. The method comprises determining the number of steps that the patient should take during a set period of time, providing the patient with an ambulatory aid equipped with a step counter, and instructing the patient to take the determined number of steps with the ambulatory aid during the set period of time.

DETAILED DESCRIPTION OF THE INVENTION

Figure 1:
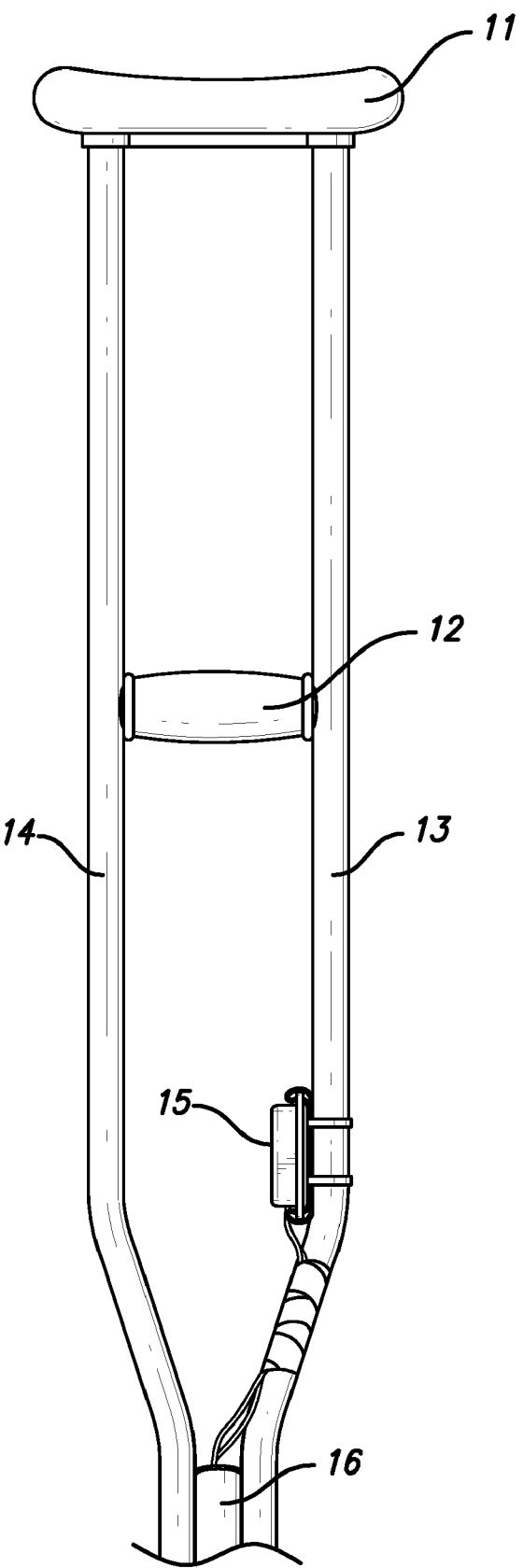
FIG. 1 is a side view of a crutch embodiment of the ambulatory aid showing the arm rest 11, middle support 12, front support 13, back support 14, housing 15 of the data recorder (also referred to herein as a counter or a counter recorder), and center support 16.

The present invention provides an ambulatory aid, which has a ground-contacting surface and which can count the steps of a user. Any suitable ambulatory aid can be used, examples of which include, but are not limited to, crutches, canes, and walkers. Such ambulatory aids are commercially available from numerous suppliers.

The aid comprises a pressure-sensitive switch 28 on the ground-contacting surface 29. Any suitable pressure-sensitive switch can be used. The switch should be mounted such that it is not activated by any motion other than normal ambulation for the particular ambulatory aid employed. Mounting the switch so that the plunger (also referred to herein as button) of the switch is countersunk, such as up to about 2 mm from flush with the ground-contacting surface 29 of a crutch, for example, so that the switch 28 is not activated unless the ground-contacting surface 29 is compressed at least about 4 mm achieves switch activation during normal ambulation only, e.g., upon application of about 20-30 lbs of weight onto the crutch.

Preferably, the pressure-sensitive switch 28 can withstand repetitive activation and contact with a wide variety of ground surfaces (e.g., concrete, wood, ceramic tile, carpeting, grass, and fine gravel, all of which are collectively referred to herein as "ground" and "ground surfaces"). In addition, the switch 28 should function under a wide range of weather conditions. Pressure-sensitive switches are commercially available from numerous suppliers.

The aid further comprises a data recorder 24. Any suitable data recorder can be used. Preferably, the data recorder is compact in size, battery-powered, and able to withstand vibrations resulting from repeated application of weight to the ambulatory aid and unevenness of ground surfaces. The data recorder also preferably comprises an on-off switch and a reset switch. The data recorder can be located anywhere on the ambulatory aid. Preferably, it is placed in a location that does not interfere with the use of the ambulatory aid. In addition, the data recorder must record the activation of the pressure-sensitive switch 28. Such communication can be wired or wireless. Wired communication is exemplified herein. Data recorders are commercially available.

The pressure-sensitive switch 28 is activated upon contact of the ground-contacting surface 29 of the aid with ground. Upon activation of the pressure-sensitive switch, the switch sends a signal to the data recorder 24. The data recorder 24 records the signal as a step. Preferably, the data recorder 24 has a display screen 26, such as a digital display screen, which displays at least the number of steps taken by the user but which may also display the date, the day, the time, and/or when recording began, and the like. Additionally, if a force-measuring switch and a more advanced data recorder are used, the ambulatory aid can be equipped to measure force applied with each step, and data can be downloaded to a PC for further analysis.

The data recorder 24 and the battery 21, which powers it, are preferably contained within a housing 15 on the aid. Any suitable housing can be used. Preferably, the housing is lightweight, durable, and waterproof. The housing can be plastic, aluminum, or stainless steel, for example. Preferably, the housing is plastic. The housing can be attached to the ambulatory aid by any suitable means. The housing can be fixedly or removably attached, such as with screws, plastic or metal staps/brackets, hook-and-loop tape (Velcro®), or glue. Preferably, the housing comprises a removable cover 23 or a window to enable reading of the display screen of the data recorder. If the housing comprises a window for reading of the display screen, preferably the housing still comprises at least a small removable cover to enable replacement of the battery. The cover 23 can be secured to the housing by any suitable means, such as screws or a snap-tab closure.

One embodiment of the present invention is exemplified in FIGS. 1-6. FIG. 1 is a side view of a crutch embodiment of the ambulatory aid showing the housing 15, which contains the data recorder and the battery, mounted near the base of the inside surface of the front support 13. Alternatively, the housing 15 could be mounted near the base of the inside surface of the back support 14, on the outside surface of the front support 13 or the back support 14, or near the middle support 12, which connects the front support 13 and the back support 14, or near the arm rest 11. However, placement of the aid near the base of the inside surface of either of the front support 13 or back support 14 is preferred.

Figure 2:
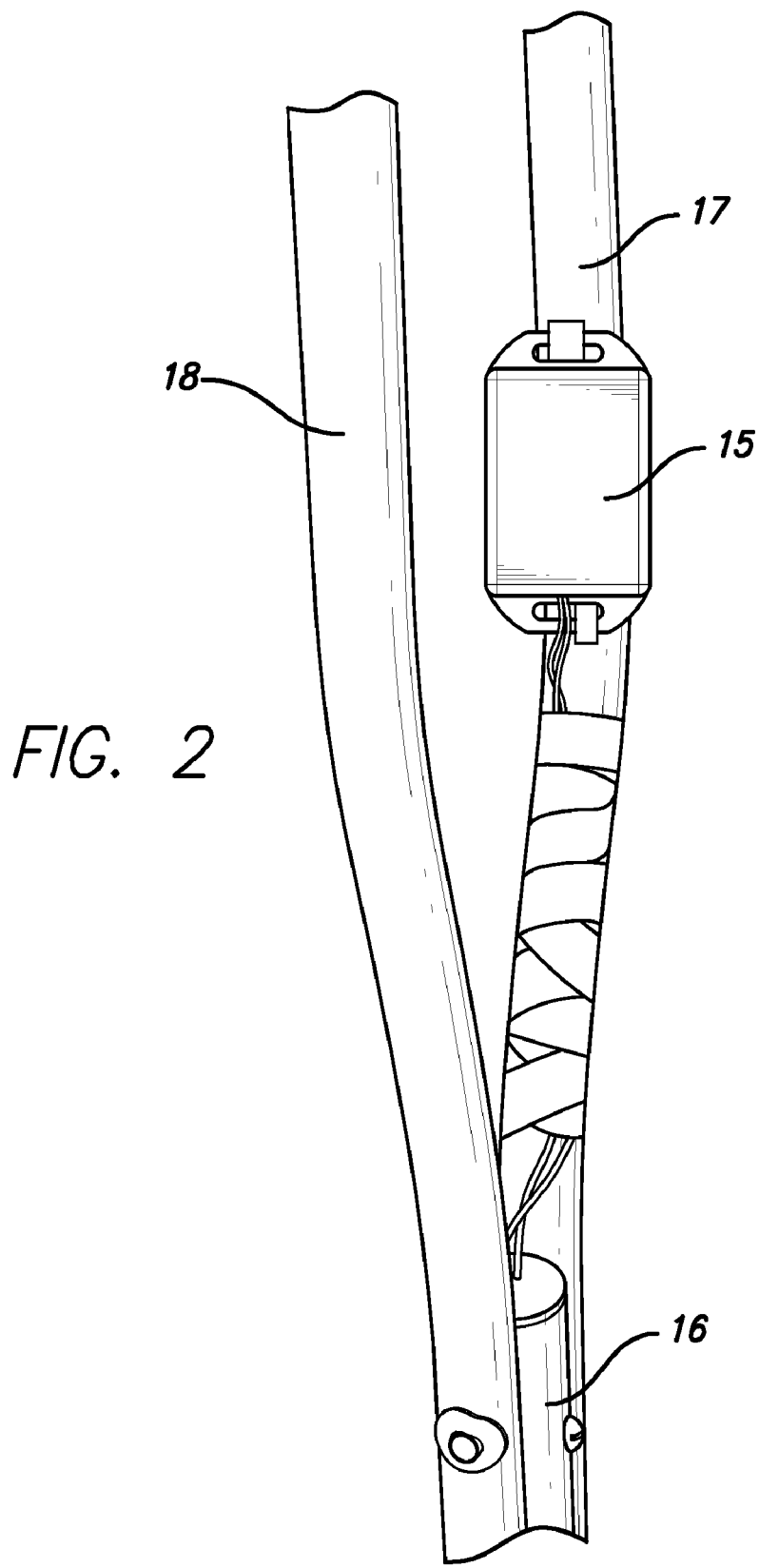
FIG. 2 is a view of the mid-section of the crutch embodiment of the ambulatory aid showing the back side 18 of the back support, the side of the center support 16, and the attachment of the housing 15 of the data recorder to the back side 17 of the front support of the crutch.

FIG. 2 is a view of the mid-section of the crutch embodiment of the ambulatory aid showing the attachment of the housing 15, which contains the data recorder and the battery, to the crutch. Here, the housing 15 is attached to the crutch with plastic ties.

Figure 3:
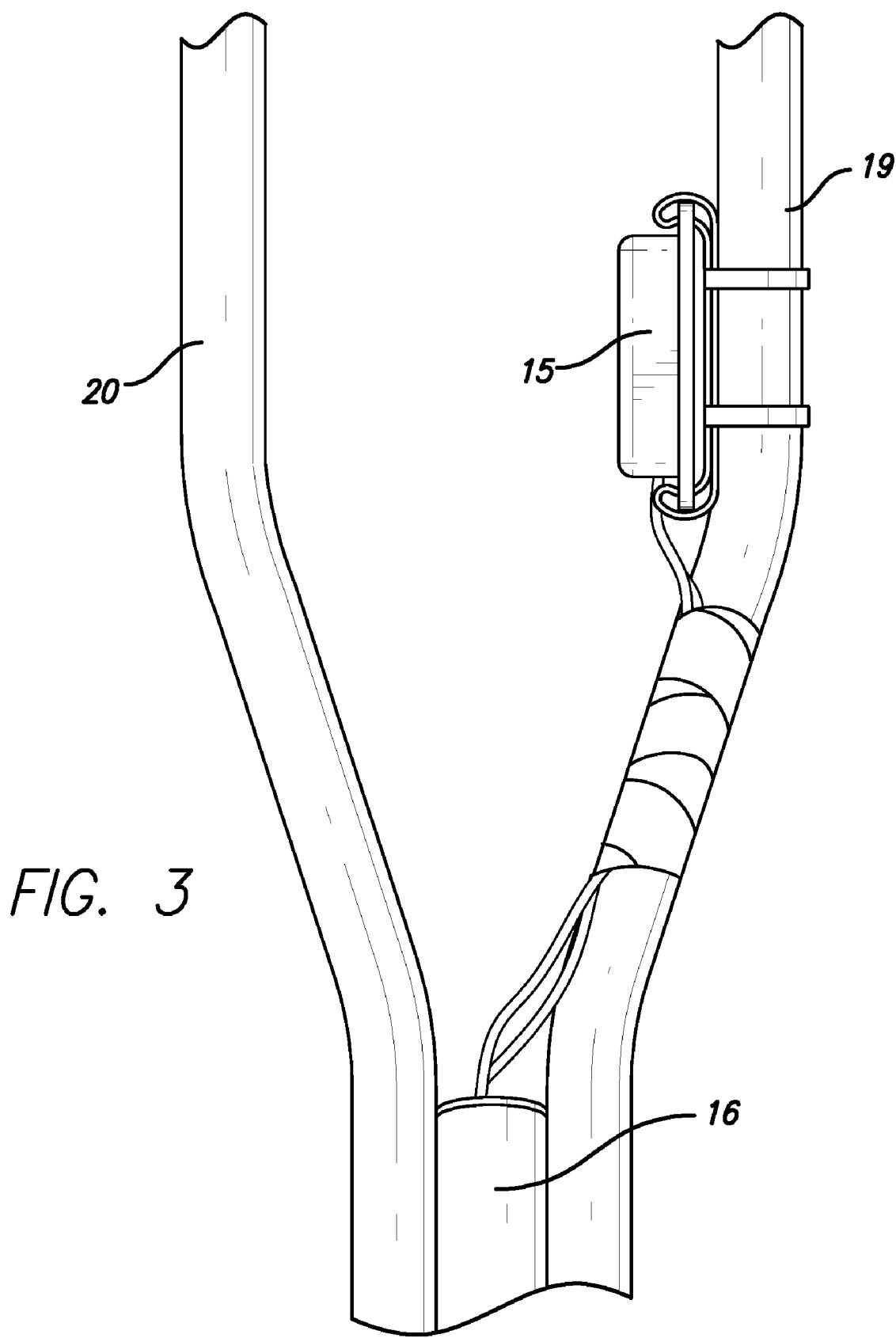
FIG. 3 is a side view of the mid-section of the crutch embodiment of the ambulatory aid showing the side 19 of the front support, the side 20 of the back support, and the attachment of the housing 15 of the data recorder to the front support of the crutch.

FIG. 3 is a side view of the mid-section of the crutch embodiment of the ambulatory aid showing the attachment of the housing 15 of the data recorder 24. Here, the wires, which join the pressure-sensitive switch and the data recorder, are attached to the ambulatory aid with tape. Other means of attachment are possible.

Figure 4:
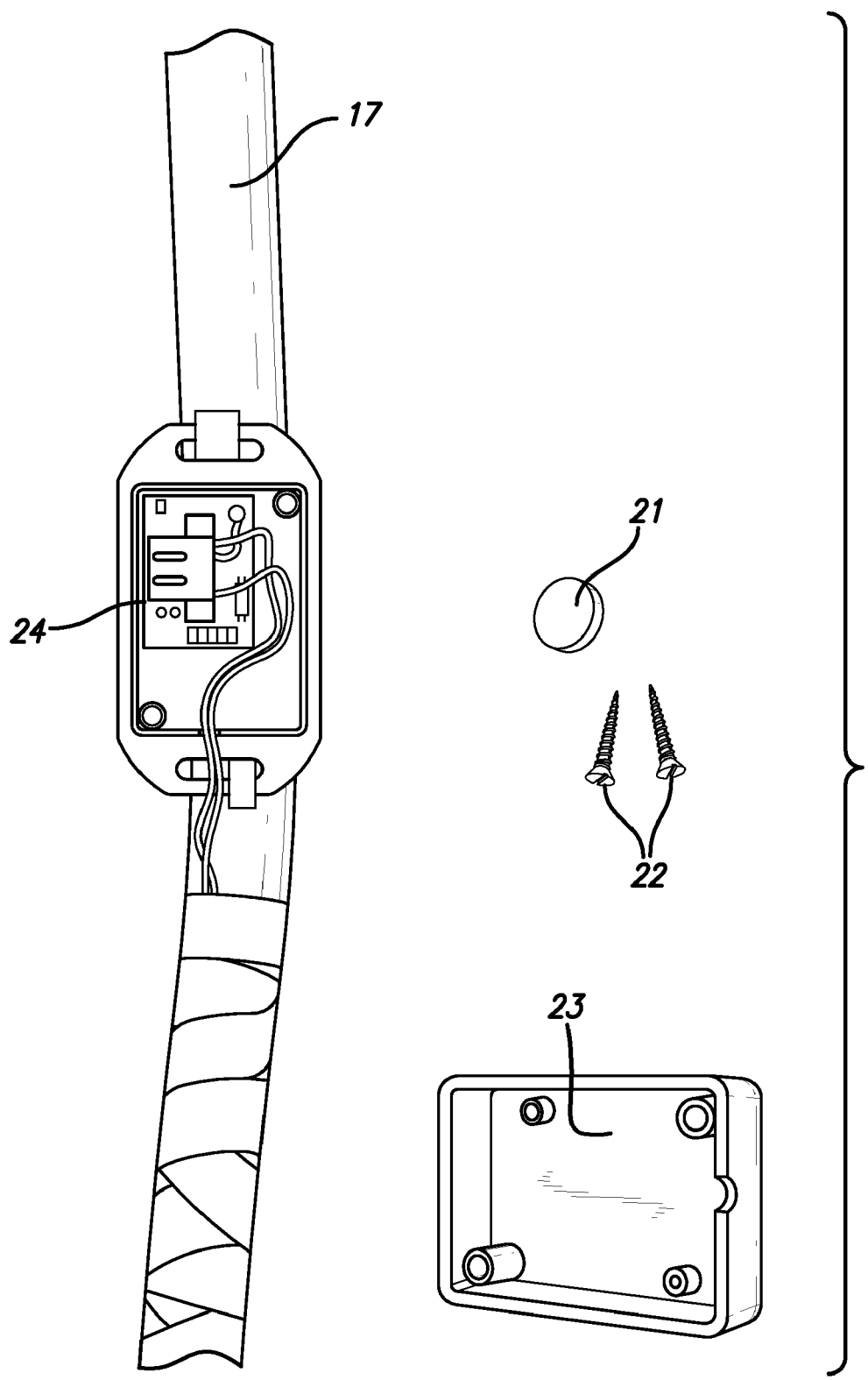
FIG. 4 is an inside view of the housing 15 of the data recorder 24, the removable cover 23 of the housing, the battery 21, and screws 22 used to secure the removable cover 23 of the housing.
Figure 5:
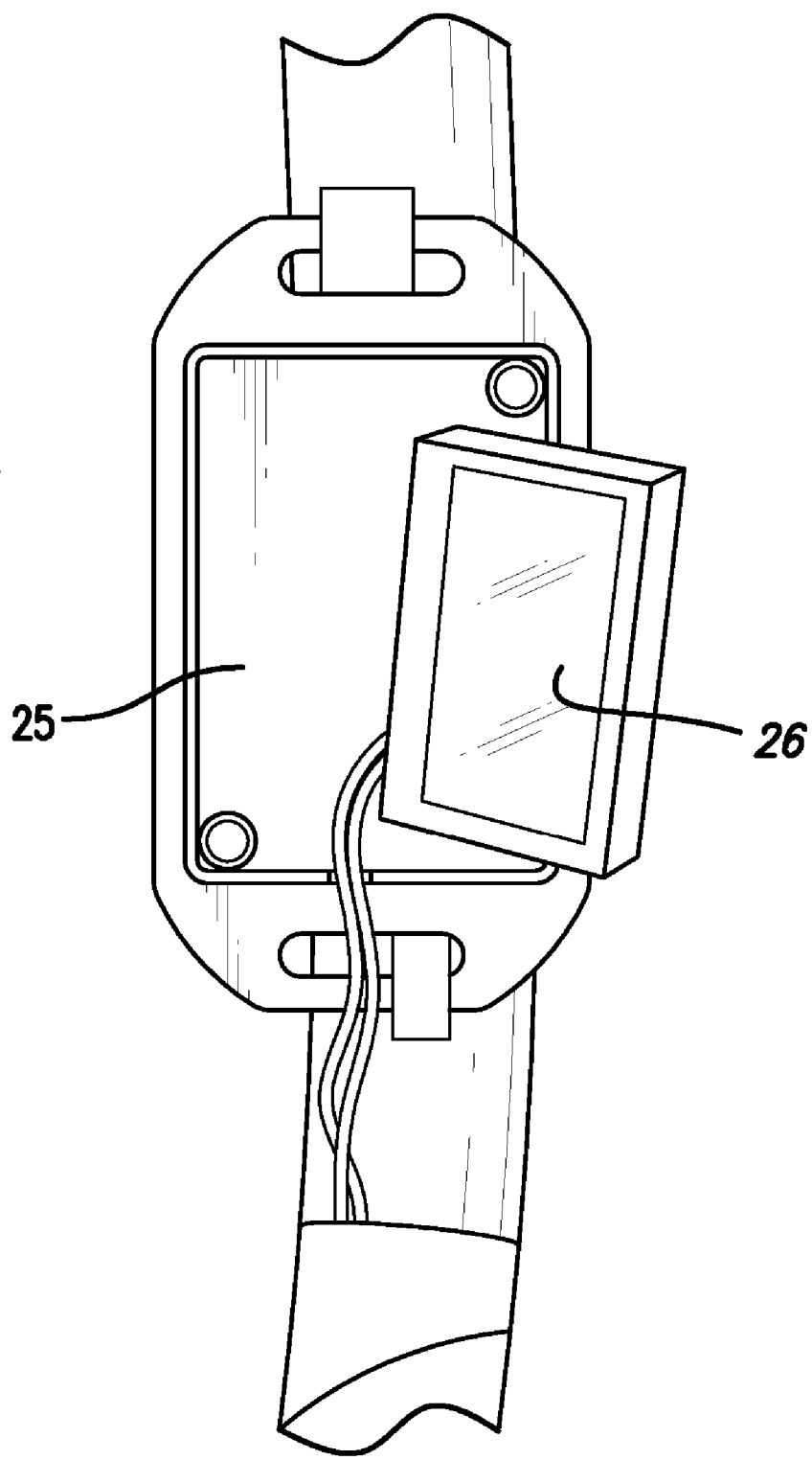
FIG. 5 is an inside view of the back of the housing 25 and the screen 26 of the data recorder.

FIG. 4 is an inside view of the housing showing the data recorder 24, the battery 21, the removable cover 23 of the housing, and the screws 22 used to secure the removable cover 23. FIG. 5 is an inside view of the housing 15 showing the back 25 of the housing and the screen 26 of the data recorder.

Figure 6A:
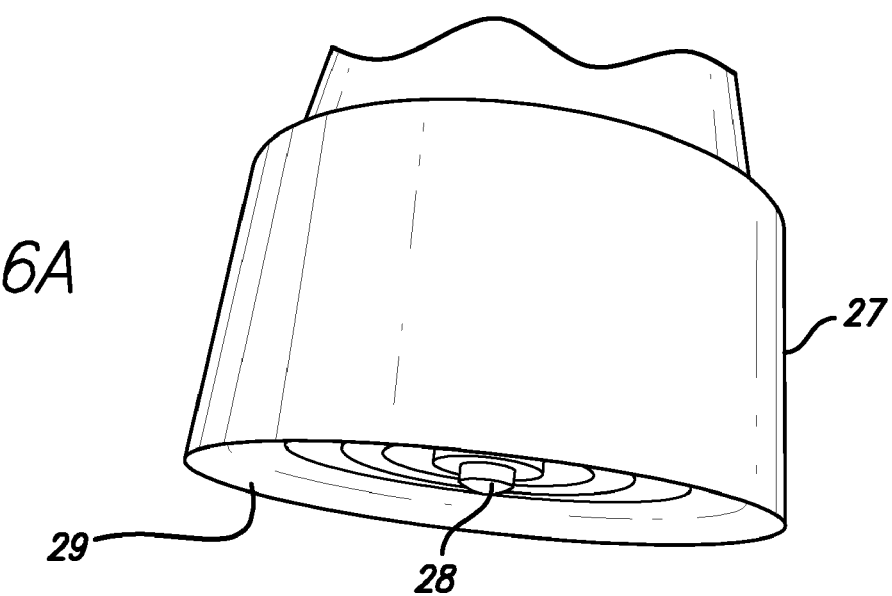
FIG. 6a is a side view of the ground-contacting end 27 of the ambulatory aid showing the pressure-sensitive switch 28 (also referred to herein as a counter button) on the ground-contacting surface 29 of the ground-contacting end 27.
Figure 6B:
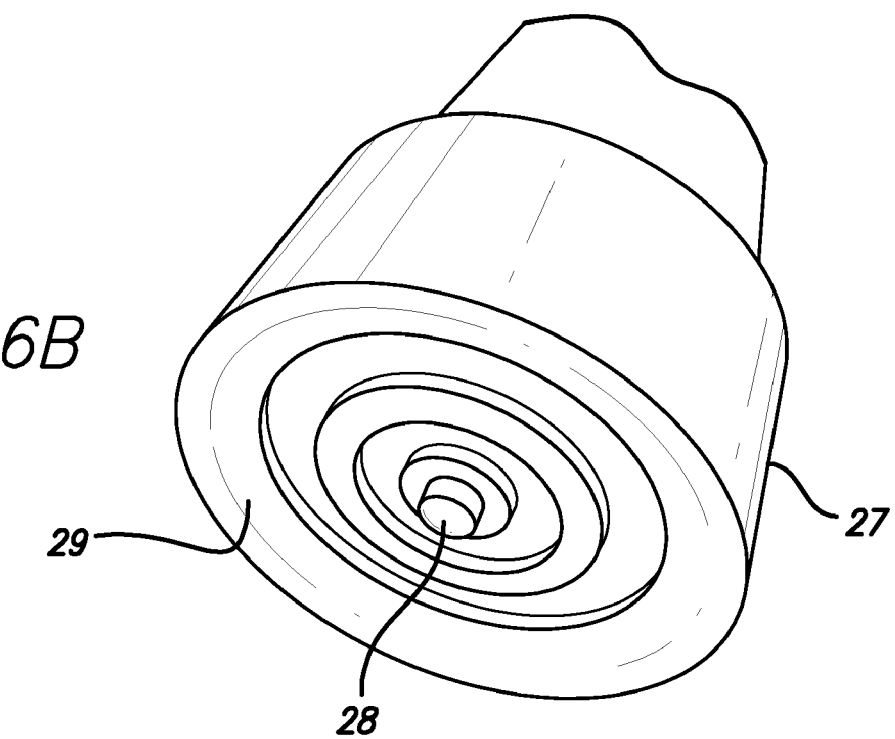
FIG. 6b is a bottom view of the ambulatory aid showing the pressure-sensitive switch 28 on the ground-contacting surface 29 of the ground-contacting end 27.

FIG. 6a is a side view of the ground-contacting end 27 of the ambulatory aid showing the pressure-sensitive switch 28 on the ground-contacting surface 29 of the ground-containing end 27. FIG. 6b is a bottom view of the ambulatory aid showing the pressure-sensitive switch 28 on the ground-contacting surface 29 of the ground-contacting end 27. Here, the pressure-sensitive switch 28 is positioned centrally on the ground-contacting surface 29. The wires, which join the pressure-sensitive switch 28 to the data recorder 24, are run through the center support of the crutch and exit at the top of the center support between the front and back supports, at which point the wires are attached to the front support with tape. Other configurations are possible.

One of ordinary skill in the art can make and use a cane or a walker in the same manner. The housing, which contains the data recorder and the battery, can be mounted near the top of the cane. The pressure-sensitive switch is mounted on the ground-contacting surface of the ground-contacting end of the cane. The housing can be mounted just about anywhere on the walker. Preferably, it is mounted in a location that does not interfere with the use of the ambulatory aid. The pressure-sensitive switch can be mounted on the ground-contacting surface of any one of the four ground-contacting ends of the walker.

In view of the above, the present invention provides a method of counting the number of steps taken by a user of an ambulatory aid. The method comprises having the user use an ambulatory aid equipped with a step counter. Preferably, the ambulatory aid comprises a crutch, a cane, or a walker.

Also in view of the above, the present invention provides a method of establishing a therapeutic regimen for a patient in need of an ambulatory aid. The method comprises determining the number of steps that the patient should take during a set period of time, providing the patient with an ambulatory aid equipped with a step counter, and instructing the patient to take the determined number of steps during the set period of time. Preferably, the ambulatory aid comprises a crutch, a cane, or a walker, in particular one in which the data recorder of the step counter has a display screen. The period of time can be any period of time. Preferably, the period of time coincides with follow-up visits with the patient's caregiver, e.g., a physician or a physical therapist. The condition of the patient and the desired result should be taken into consideration when determining the number of steps.

The method of establishing a therapeutic regimen can further comprise modulating the therapeutic regimen. For example, the therapeutic regimen can be modulated by increasing or decreasing the number of steps to be taken during the set period of time. Alternatively, the period of time can be lengthened or shortened.

EXAMPLE

The following example serves to illustrate the present invention. The example is not intended to limit the scope of the invention in any way.

A crutch comprising a pressure-activated switch located in the ground-contacting surface (i.e., the ground-contacting surface of the ground-contacting end or stopper of the crutch) of the crutch and wired to a 6-digit digital counter enclosed in an opaque plastic box was constructed. All components were obtained from Allied Electronics (Columbia, Md.), including a pushbutton overtravel SPST switch (ITT/Cannon Industries), a 6-digit electronic totalizer (Tru-Meter), and a miniature plastic flanged enclosure (Hammond). Other components included 22 gauge copper wire, rosin core solder, 2-part epoxy, and wire ties.

The center support tube was removed from the crutch and the rubber stopper was removed from the center support. At the interface between the rubber stopper and the center support tube is a metal disk. A ⅜" hole was drilled through the metal disk and the ground-contacting surface of the rubber stopper. The switch, with leads attached, was then passed trough the hole in the rubber stopper and metal disk and placed in the desired position. The compression from the rubber stopper was sufficient to hold the switch in place until it could be permanently sealed. Next, the stopper was placed back on the end of the center support tube and the wire leads were passed through the tube and out the top. The assembly was then placed upright on the ground-contacting surface of the rubber stopper, and epoxy was mixed and poured down the inside of the tube to a level that completely submerged the switch, thereby permanently sealing the assembly. The leads were then brought out the top of the center support tube and connected to the step counter assembly, which was placed on the inside surface of the front support of the assembled crutch and attached to the front support with wire ties.

All references, including publications, patent applications, and patents, cited herein are hereby incorporated by reference to the same extent as if each reference were individually and specifically indicated to be incorporated by reference and were set forth in its entirety herein.

The use of the terms "a," "an," "the," and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illustrate better the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A step-counting ambulatory aid having a ground-contacting surface, which aid comprises:
   a pressure-sensitive switch on the ground-contacting surface; and
   a data recorder located elsewhere on the aid at a location on the aid that is accessible to a user of the device,
   wherein the pressure-sensitive switch is activated upon contact of the ground-contacting surface of the aid with ground, whereupon the pressure-sensitive switch sends a signal to the data recorder, and whereupon the data recorder records the signal as a step, and
   wherein said data recorder is adapted to directly communicate a number of steps recorded by the data recorder to a user of the ambulatory aid by displaying the number of steps on a display screen of the data recorder,
   wherein the ambulatory aid is a crutch, a crane, or a walker.

2. The ambulatory aid of claim 1, wherein the data recorder is contained within a housing on the aid.

3. The ambulatory aid of claim 2, wherein the data recorder is powered by a battery located within the housing.

4. The ambulatory aid of claim 1, wherein the display screen comprises a digital display screen.

5. The ambulatory aid of claim 1, wherein the data recorder is powered by a battery.

6. A method comprising
   counting a number of steps taken by a user of the ambulatory aid of claim 1.

* * * * *